United States Patent
Kojima et al.

(10) Patent No.: US 8,890,382 B2
(45) Date of Patent: Nov. 18, 2014

(54) MOTOR AND VEHICLE-MOUNTED AIR CONDITIONER USING SAME

(75) Inventors: Masao Kojima, Osaka (JP); Tomohiko Naya, Osaka (JP); Koji Kuyama, Hyogo (JP); Yasushi Kamada, Kyoto (JP)

(73) Assignee: Panasonic Corporation, Osaka (JP)

( * ) Notice: Subject to any disclaimer, the term of this patent is extended or adjusted under 35 U.S.C. 154(b) by 98 days.

(21) Appl. No.: 13/640,939

(22) PCT Filed: Jun. 6, 2011

(86) PCT No.: PCT/JP2011/003165
§ 371 (c)(1),
(2), (4) Date: Oct. 12, 2012

(87) PCT Pub. No.: WO2011/158461
PCT Pub. Date: Dec. 22, 2011

(65) Prior Publication Data
US 2013/0026865 A1    Jan. 31, 2013

(30) Foreign Application Priority Data
Jun. 14, 2010   (JP) ................. 2010-134757

(51) Int. Cl.
| | |
|---|---|
| H02K 5/167 | (2006.01) |
| F04D 29/056 | (2006.01) |
| F04D 29/057 | (2006.01) |
| F04D 17/16 | (2006.01) |
| H02K 7/08 | (2006.01) |
| F04D 29/051 | (2006.01) |
| F04D 25/06 | (2006.01) |

(52) U.S. Cl.
CPC ............ *H02K 7/085* (2013.01); *H02K 2205/03* (2013.01); *F04D 29/056* (2013.01); *F04D 29/057* (2013.01); *F04D 17/16* (2013.01); *F04D 29/051* (2013.01); *F04D 25/0606* (2013.01)
USPC .............................................. 310/90; 310/51

(58) Field of Classification Search
CPC ..... B60H 1/00285; B60H 1/0027; B60N 2/56
USPC ..................... 310/51, 90; 297/180.13, 180.14
See application file for complete search history.

(56) References Cited

U.S. PATENT DOCUMENTS

| | | |
|---|---|---|
| 2005/0264121 A1 | 12/2005 | Yajima et al. |
| 2006/0071563 A1 | 4/2006 | Fujii |
| 2006/0261696 A1 | 11/2006 | Yajima et al. |

FOREIGN PATENT DOCUMENTS

| | | |
|---|---|---|
| JP | 10-004642 A | 1/1998 |
| JP | 2000-050595 A | 2/2000 |
| JP | 2005-341713 A | 12/2005 |
| JP | 2006-109575 A | 4/2006 |
| JP | 2007-100600 A | 4/2007 |

OTHER PUBLICATIONS

International Search Report for International Application No. PCT/JP2011/003165, dated Jun. 28, 2011, 2 pages.

*Primary Examiner* — Quyen Leung
*Assistant Examiner* — Naishadh Desai
(74) *Attorney, Agent, or Firm* — Brinks Gilson & Lione

(57) ABSTRACT

A motor includes a shaft, a rotor mounted to the shaft along an axial direction of the shat, a stator confronting an outer wall of the rotor via a space, a thrust plate, and a buffering plate having elastic force. The rotor and the stator are disposed such that a magnetic center of the rotor is away from a magnetic center of the stator by a given distance along the axial direction. The thrust plate is disposed in the axial direction and in a direction along which restoring force acts. The buffering plate is disposed oppositely to the shaft relative to the thrust plate and supports the thrust plate.

14 Claims, 8 Drawing Sheets

MOTOR AND VEHICLE-MOUNTED AIR CONDITIONER USING SAME

This application is a 371 application of PCT/JP2011/003165 having an international filing date of Jun. 6, 2011, which claims priority to JP2010-134757 filed Jun. 14, 2010, the entire contents of which are incorporated herein by reference.

TECHNICAL FIELD

The present invention relates to a motor and an on-vehicle air conditioner using the same motor, more particularly it relates to a motor that lowers a collision sound produced between a shaft and a thrust plate, and to an on-vehicle air conditioner using this motor.

BACKGROUND ART

A motor to be used in a blower of an on-vehicle air conditioner has not any more employed ball bearings at both ends of a shaft because this motor should be downsized. Instead of employing the ball bearings, a rotor and a stator are disposed with a given distance between a magnetic center of the rotor and a magnetic center of the stator along an axial direction of the shaft. This structure allows magnetic restoring force to act between the rotor and the stator. This magnetic restoring force (hereinafter simply referred to as restoring force) causes both of the magnetic centers along the axial direction to agree with each other, and this restoring force allows the shaft to push a thrust plate with its end called as a pivot.

In a case where the on-vehicle air conditioner is installed in a variety of vehicles, a difference occurs in gravity acting direction depending on an installation state of the on-vehicle air conditioner. However, use of a structure where the restoring force discussed above is used allows not changing a positional relation between the rotor and the stator along the axial direction of the shaft even if the difference occurs in the gravity acting direction. As a result, a steady motor function is obtainable. The thrust plate is mounted to a housing of the motor. (Refer to, e.g. Patent Literature 1.)

Use of the foregoing conventional motor in the on-vehicle air conditioner, however, encounters the following problems: For instance, in a case where a conventional air conditioner is mounted to a car, when the car runs on a bad road or bumps on a road, force greater than and opposite to the restoring force is sometimes applied to the shaft. As a result, the shaft leaves the thrust plate instantaneously, and when the force greater than the restoring force disappears; the shaft tries to return to its original position with the aid of the restoring force. At this time, the shaft hits the thrust plate, and a collision sound is generated between the shaft and the thrust plate.

Patent Literature 1: Unexamined Japanese Patent Application Publication No. 2007-100600

DISCLOSURE OF THE INVENTION

A motor of the present invention comprises a shaft, a rotor mounted to the shaft along an axial direction of the shaft, a stator confronting an outer wall of the rotor via a space, a thrust plate, and a buffering plate having elastic force.

The rotor and the stator are disposed with a given distance, along an axial direction of the shaft, between a magnetic center of the rotor and a magnetic center of the stator. The thrust plate is disposed in the axial direction and in a restoring-force acting direction, where the restoring force is produced due to a structure in which the rotor and the stator are disposed with a given distance therebetween. The buffering plate is disposed opposite to the shaft relative to the thrust plate, and supports the thrust plate.

When external load is applied to the motor and thus force greater than the restoring force is applied to the shaft, the shaft leaves the thrust plate, and then the restoring force causes the shaft to return to its original position, whereby the shaft hits the thrust plate. The present invention allows the buffering plate to buffer this shock. In other words, the present invention allows the buffering plate to buffer the shock produced by a collision between the shaft and the thrust plate, where the collision is caused by the external force applied to the motor. As a result, a collision sound produced by this collision can be lowered.

DETAILED DESCRIPTION OF THE PREFERRED EMBODIMENT EXEMPLARY EMBODIMENT

A motor in accordance with the embodiment of the present invention comprises a shaft, a rotor mounted to the shaft along an axial direction of the shaft, a stator confronting an outer wall of the rotor via a space, a thrust plate, and a buffering plate having elastic force.

The rotor and the stator are disposed with having a given distance between a magnetic center of the rotor and a magnetic center of the stator along an axial direction of the shaft. The thrust plate is disposed along the axial direction and along a restoring-force acting direction, where the restoring force is generated due to a structure in which the rotor and the stator are disposed with a given distance therebetween. The buffering plate is disposed opposite to the shaft relative to the thrust plate, and supports the thrust plate.

When a car runs on a bad road or bumps on a road, force greater than and opposite to the restoring force is sometimes applied to the shaft. Use of the foregoing motor in such a case will allow the buffering plate to buffer a shock at a collision between the shaft and the thrust plate. As a result, a collision sound generated by the collision between the shaft and the thrust plate can be lowered.

The embodiment is demonstrated hereinafter with reference to the accompanying drawings. The advantage obtained from the present invention is not limited only to this embodiment.

Figure 1:
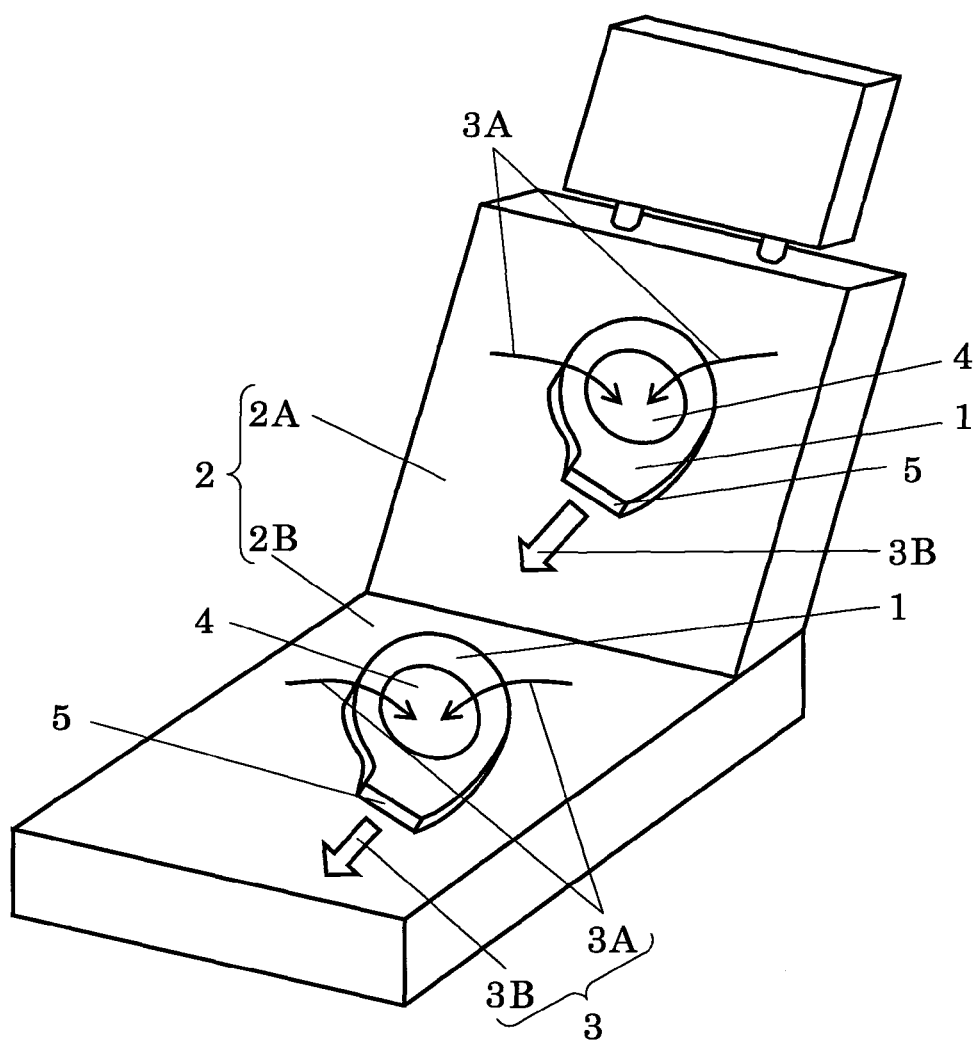
FIG. 1 is a perspective view schematically illustrating an on-vehicle air conditioner, in accordance with an embodiment of the present invention, built in a seat.
Figure 2:
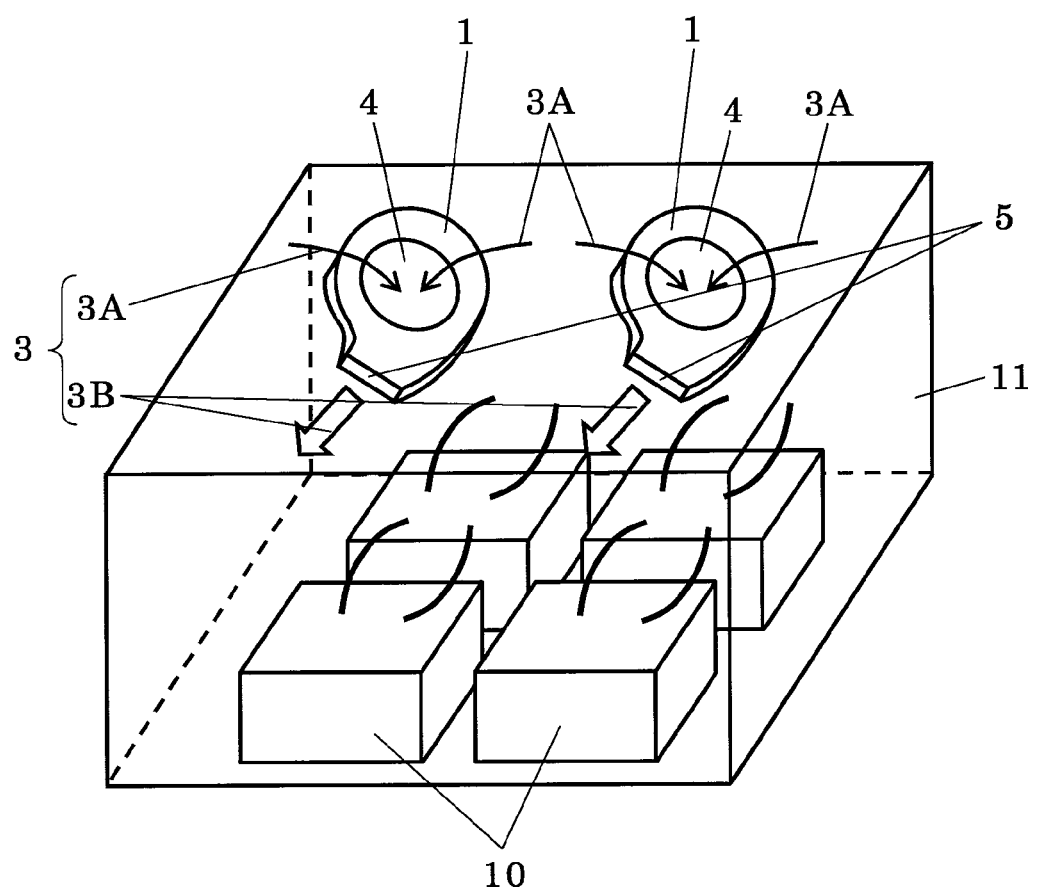
FIG. 2 is a perspective view schematically illustrating the on-vehicle air conditioner, in accordance with the embodiment of the present invention, disposed in a container.

FIG. 1 and FIG. 2 show examples of usage of an on-vehicle air conditioner employing the motor in accordance with this embodiment. In FIG. 1, on-vehicle air conditioner 1 is built in seat 2 on which a driver or a person sharing the car sits. To be more specific, it is built in backrest 2A or seating face 2B of seat 2. The airflow of on-vehicle air conditioner 1 in use is indicated with arrows 3 (3A, 3B). Air conditioner 1 employs a sirocco fan, so that the air sucked (3A) through sucking port 4 is blown (3B) from blow-off port 5 disposed on a face substantially orthogonal to sucking port 4 as shown in FIG. 1.

In FIG. 1, sucking ports 4 are disposed both on the surface side of backrest 2A and on the top face side of seating face 2B so that airflows 3 can be illustrated simply. However, when comfortableness to a driver or a person sharing the car is taken into consideration, or when simpler air suction to an on-vehicle air conditioner should be taken into account, sucking ports 4 are preferably disposed on the rear side of backrest 2A and on the lower side of seating face 2B.

FIG. 2 shows a case where on-vehicle air conditioner 1 is used for cooling on-vehicle battery 10. Use of a motor in smaller size allows downsizing this on-vehicle air conditioner 1 comparing with a conventional air conditioner. As a result, air conditioner 1 can be placed with a higher degree of freedom, so that on-vehicle air conditioner 1 can be placed at a place suitable for cooling respective on-vehicle batteries 10. As a result, a more efficient airflow circuit can be formed, and energy saving can be progressed.

Figure 3:
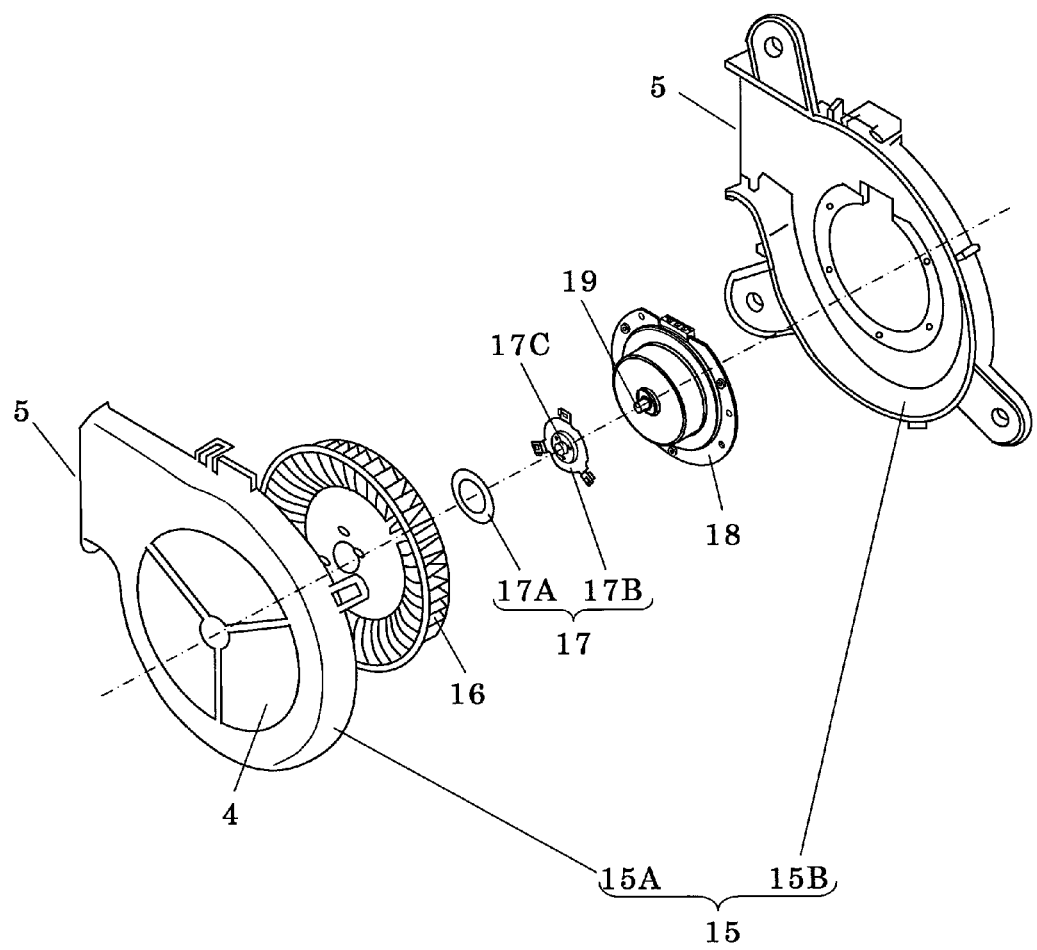
FIG. 3 outlines a structure of the on-vehicle air conditioner in accordance with the embodiment.
Figure 4:
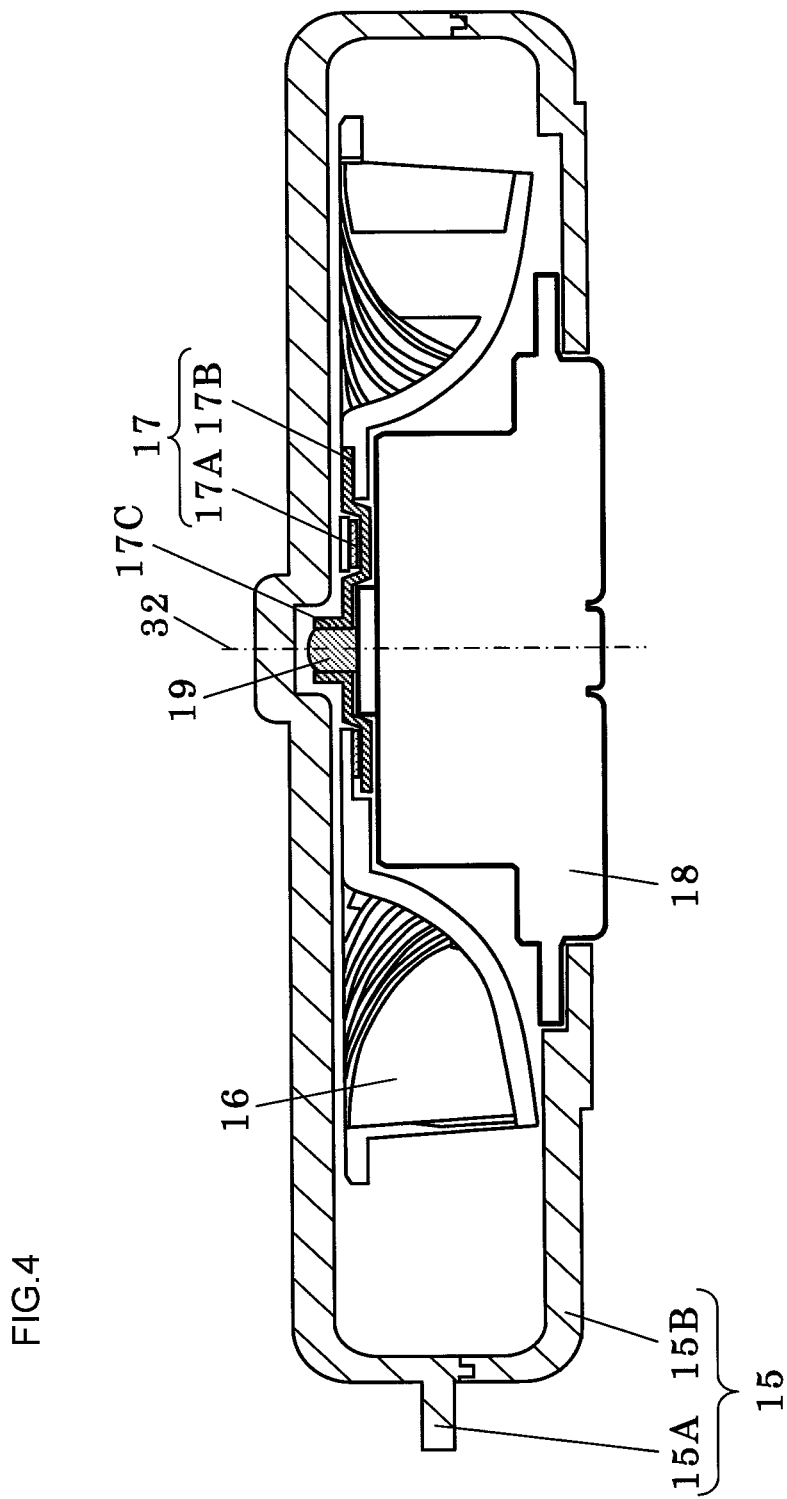
FIG. 4 is a sectional view of an essential part of the on-vehicle air conditioner in accordance with the embodiment.

FIG. 3 outlines the on-vehicle air conditioner of the present invention. FIG. 4 is a sectional view of an essential part of the on-vehicle air conditioner.

Housing 15 (15A, 15B) accommodates fan 16, fan fixing section 17, and motor 18. Housing 15 includes sucking port 4 and blow-off port 5. Housing 15 is made of resin, e.g. polybutylene terephthalate (PBT), polycarbonate (PC), polypropylene (PP), or mixed material of these resins, or the mixed agent with glass fiber.

Fan 16 employs a sirocco fan as discussed previously. Fan fixing section 17 is formed of elastic plate 17A and fan mounting plate 17B. Plate 17A is made of silicone rubber, which can be replaced with another rubber or adhesive that can retain a given elastic force after it is hardened. To be more specific, any silicone intimate mixture can produce an advantage similar to what is discussed previously. Instead of silicone rubber, en elastic foamed material can be used. To be more specific, rubber sponge or urethane sponge can produce an advantage similar to what is obtained by foregoing elastic plate 17A. Fan mounting plate 17B is made of metal or resin. An electric galvanizing sheet can be used as the metal material, and PBT, PC, PP or the mixed member of these resins, or the mixed member with glass fiber can be used as the resin material. Shaft 19 of motor 18 is inserted into hole 17C punched in fan mounting plate 17B at the center. Shaft 19 is press-fitted in this hole 17C, thereby mounting rigidly fan mounting plate 17B to shaft 19.

Figure 5:
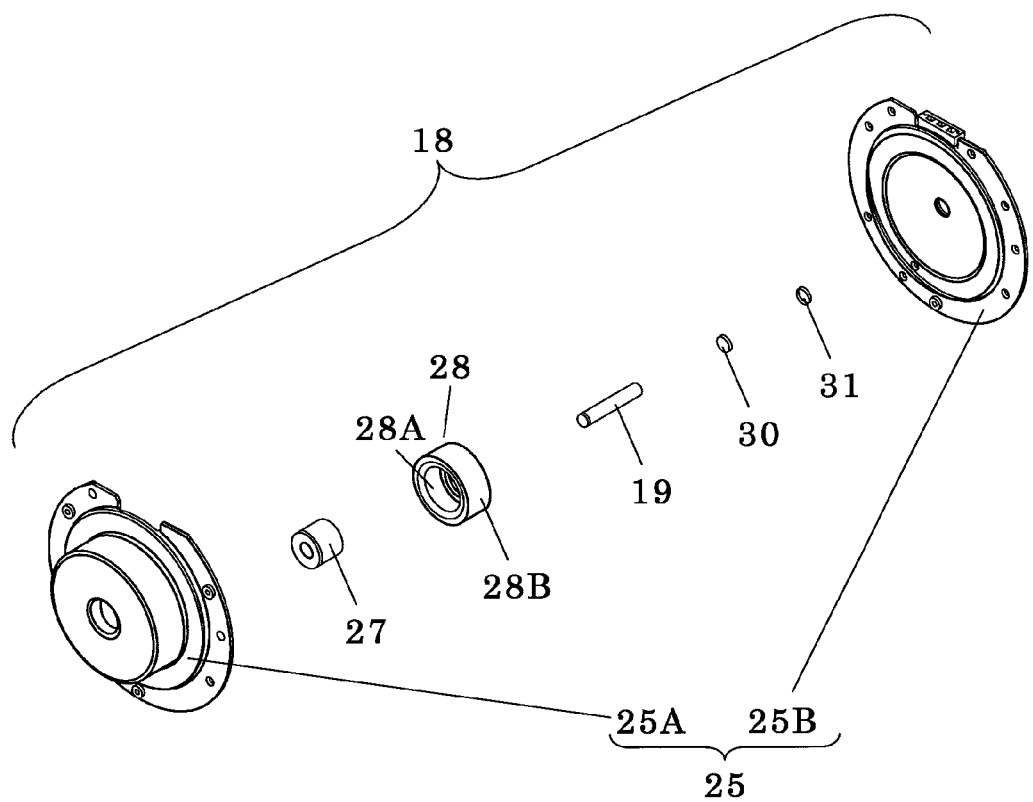
FIG. 5 outlines a motor in accordance with the embodiment.
Figure 6:
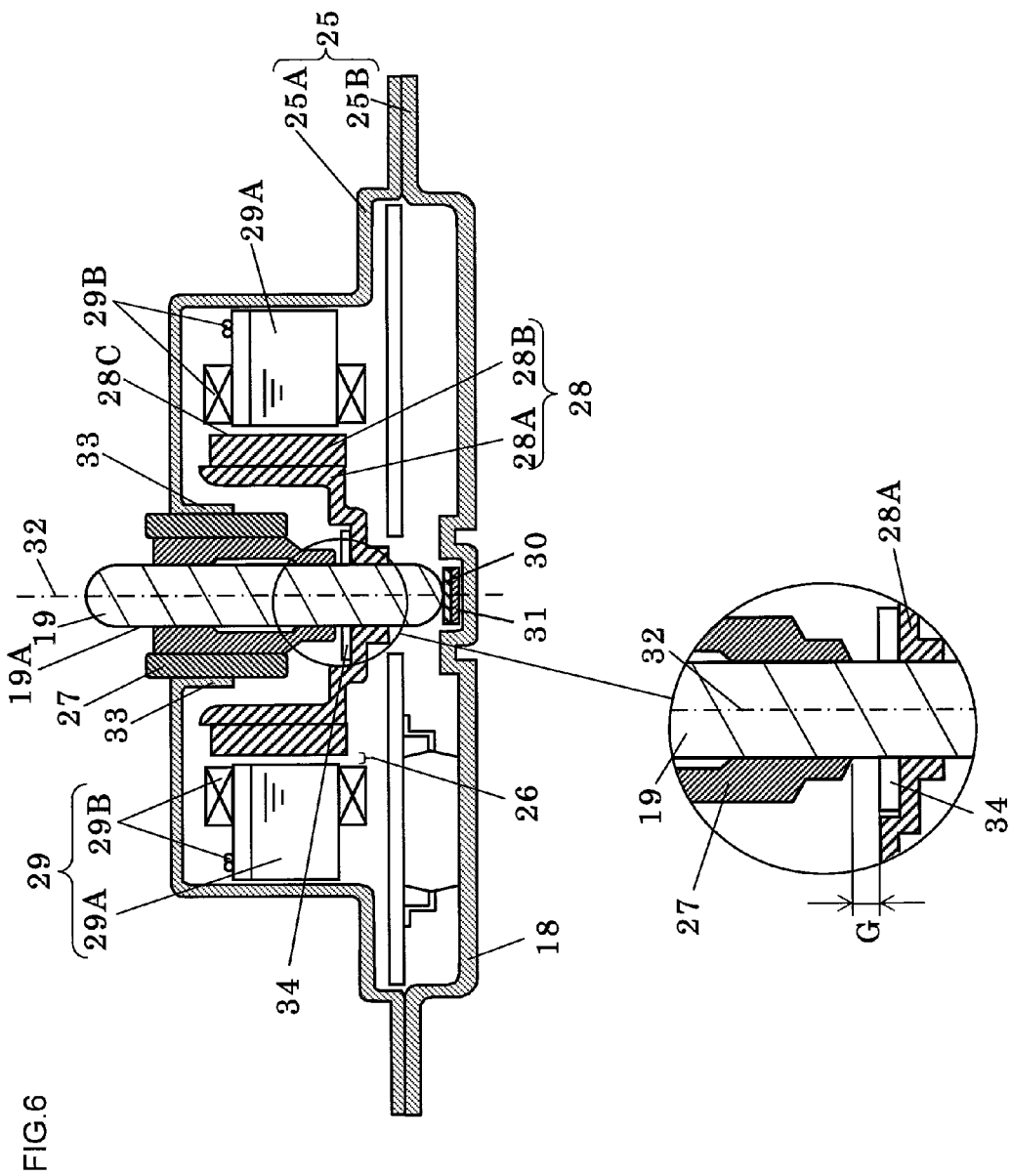
FIG. 6 is a sectional view of the motor in accordance with the embodiment.

Next, the structure of motor 18 is described with reference to FIG. 5 and FIG. 6. FIG. 5 outlines a structure of motor 18, and FIG. 6 is a sectional view of motor 18. This embodiment employs an inner-rotor type brushless motor. Motor housing 25 (25A, 25B) accommodates shaft 19, bearing 27, rotor 28, stator 29, thrust plate 30, and buffering plate 31.

Motor housing 25 used in this embodiment is made of electro-galvanizing steel sheet. Shaft 19 is made of martensitic stainless steel, and has dimensions of diameter=3 mm, length=17 mm. Bearing 27 belongs to plain bearing or metal bearing, for instance it is a sintered oilless bearing and made of Fe—Cu—Sn—(C) material. Bearing 27 is mounted onto outer wall 19A of shaft 19 such that it goes along axial direction 32 of shaft 19. Shaft 19 is supported, via bearing 27, by cylindrical section 33 of housing 25A. Rotor 28 is mounted to shaft 19 along axial direction 32, and includes rotor yoke 28A and rotor magnet 28B. Rotor yoke 28A is made of electro-galvanizing steel sheet and holds rotor magnet 28B by bonding for generating torque. Rotor magnet 28B is made of rare earth bonded magnet and is sensitive to a magnetic field generated by the stator that is discussed later. Stator 29 confronts outer wall 28C of rotor 28 via a space 26. Stator 29 is formed of iron core 29A and lead-wire 29B. A given electric current runs through lead-wire 29B, whereby an electromagnet can be formed, and the electromagnet generates a magnetic field, which is controlled such that shaft 19 can rotate via rotor 28 at a desirable rpm.

Figure 7:
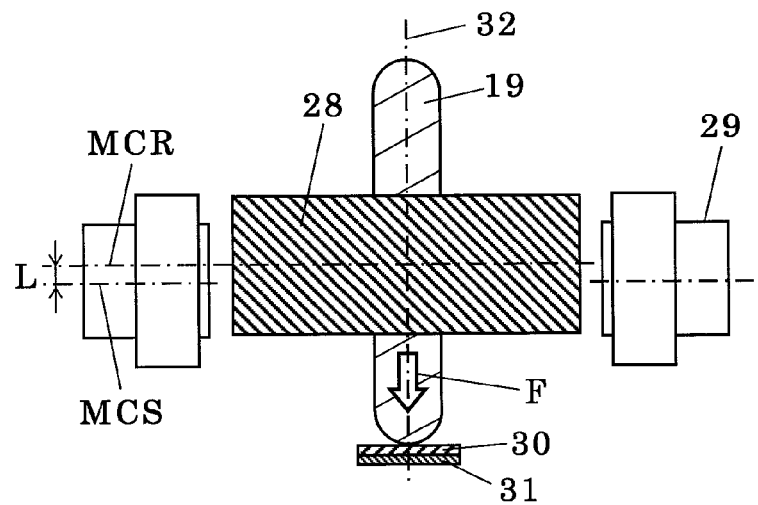
FIG. 7 illustrates a relation between a rotor and a stator in accordance with the embodiment.

FIG. 7 illustrates a relation between rotor 28 and stator 29, which are disposed with given distance L therebetween. Distance L measures a length along axial direction 32 of shaft 19 between a magnetic center MCR of rotor 28 and magnetic center MCS of stator 29. Rotor 28 and stator 29 have restoring force F that acts along a direction to cancel distance L. Restoring force F is indicated with arrows in FIG. 7, and thrust plate 30 is disposed in axial direction 32 and also in a restoring-force acting direction.

In FIG. 6, washer 34 is disposed along shaft 19 and between rotor yoke 28A and bearing 27. Washer 34 is an annular disk-like plate, and shaft 19 extends through a hole punched at the center of washer 34. Space G is provided between washer 34 and rotor yoke 28A or between washer 34 and bearing 27. The presence of foregoing washer 34 mitigates scars or frictional wear produced when rotor yoke 28 touches bearing 27 during the spin. To obtain this advantage of washer 34, it is preferable to use washer 34 having sufficient mechanical strength and a surface of low friction.

Figure 8:
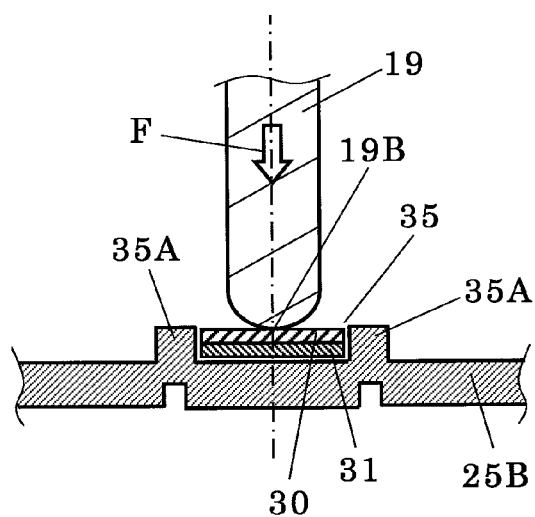
FIG. 8 is an enlarged view of an essential part of the motor in accordance with the embodiment.

FIG. 8 is an enlarged view of an essential part of FIG. 6. Motor housing 25B includes bearing section 35, which is disposed at shaft 19 side of motor housing 25B. Bearing section 35 is formed of projection 35A having an inner diameter ready to receive an end of shaft 19. Thrust plate 30 and buffering plate 31 are disposed within bearing section 35. To be more specific, thrust plate 30 is disposed at the place where shaft 19 touches, and buffering plate 31 is disposed oppositely to shaft 19 relative to thrust plate 30.

Shaft 19 pushes thrust plate 30 at its end, i.e. pivot 19B, downward (restoring-force F acting direction) in FIG. 8. In other words, thrust plate 30 supports shaft 19 with pivot 19B. Thrust plate 30 needs sufficient abrasive resistance because it should support rotating shaft 19. Thrust plate 18 is thus preferably made of polyether ether ketone (PEEK) or ceramic.

Buffering plate 31 is disposed between thrust plate 30 and motor housing 25B. Buffering plate 31 elastically deforms itself, thereby buffering a shock applied to thrust plate 30, so that it is made of rubber, foamed material, or adhesive. These materials have Young's modulous equal to or greater than 9 MPa for generating an advantage similar to what is discussed above. If rubber is used as the material for buffering plate 31, silicone rubber, methyl silicone, fluoro-rubber can be used. If the foamed material is used, rubber sponge or urethane sponge can be used. In a case of using the adhesive, it should have Young's modulus equal to or greater than 3 MPa, so that silicone intimate mixture can be used.

Use of buffering plate 31 made of adhesive allows motor housing 25B to hold thrust plate 30 via buffering plate 31, so that this structure prevents thrust plate 30 from falling during the assembly. The work efficiency can be thus improved. When buffering plate 31 made of the material other than adhesive is used, thrust plate 30 can be tentatively stuck on buffering plate 31 via grease for preventing thrust plate 30 from falling.

Operations of motor 18 and on-vehicle air conditioner 1 employing motor 18 are demonstrated hereinafter. When a given electric current flows through lead-wire 29B of stator 29, a magnetic field is generated around stator 29 as a center. This magnetic field attracts or repels rotor magnet 28B of rotor 28, which rotates about shaft 19 at a given rpm. Fan 16 mounted to shaft 19 thus rotates at the given rpm, thereby producing a desirable airflow.

Figure 9:
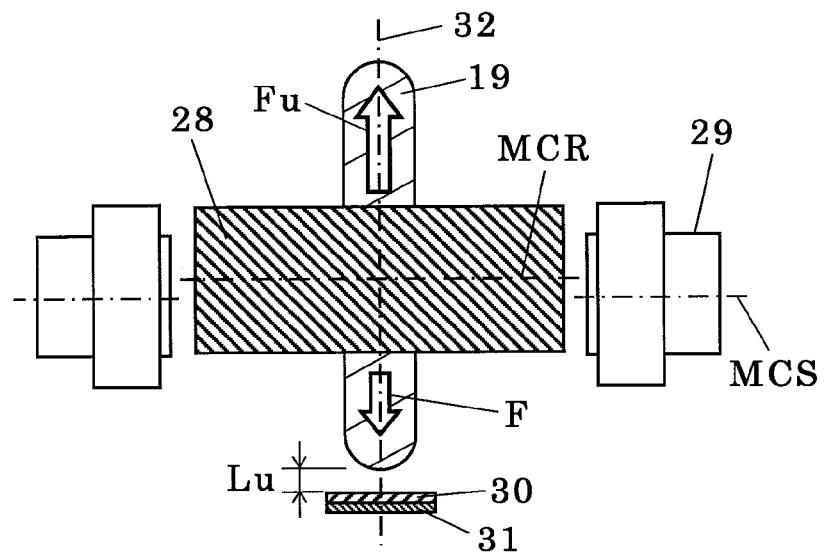
FIG. 9 illustrates a relation between a rotor and a stator in accordance with the embodiment.

On-vehicle air conditioner 1 employing this motor 18 is mounted to a car. When the car runs on a bad road or bumps on a road, shocks are produced. In this case, force Fu greater than and opposite to restoring force F is sometimes applied to shaft 19 as shown in FIG. 9. At this time, gap Lu is produced instantaneously between shaft 19 and thrust plate 30. When great force Fu disappears, restoring force F acts on shaft 19 and causes shaft 19 to forcibly return to the original position. Shaft 19 and thrust plate 30 collide fiercely with each other, so that a shock is applied from shaft 19 to thrust plate 30. This shock can be buffered by elastic deformation of buffering plate 31. As a result, a collision sound produced by this collision between shaft 19 and thrust plate 30 can be lowered.

A driver or a person sharing the car with a conventional on-vehicle air conditioner can hear this unpleasant collision sound; however, use of the motor in accordance with the embodiment allows buffering plate 31 to lower the collision sound produced by the collision between shaft 19 and thrust plate 30. There is thus no fear to give unpleasant feeling to the driver or the person sharing the car.

This embodiment employs buffering board 31 made of silicone rubber of which thickness including washer 34 should be greater than space G formed between rotor yoke 28A and bearing 27. Since space G is 0.2 mm in this embodiment, the silicone rubber having a thickness of 0.3 mm is used.

The foregoing discussion refers to the on-vehicle air conditioner to be mounted in a car; however, the vehicle is not limited to the automobile, and an advantage similar to what is previously discussed can be expected in other vehicles including a train. The advantage is not always obtained from the home-use car, but it can be obtained from the business-use car.

Space G is provided for lowering the collision sound; however, each one of components of motor 18 generally has a tolerance, so that it is difficult to prepare space G at the actual assembling site while the cumulative tolerances are taken into consideration. For instance, assume that space G is 0.2 mm, and respective components have tolerance of ±0.05 mm, then if only four components show the maximum variations, space G cannot be prepared. To accommodate the variations, dimensions of each component are measured at the production site of motor 18, and adjustment is done among the components before they are assembled into on-vehicle air conditioners individually. Space G has been thus prepared. To be more specific, the number of sheets or a thickness of washer 34, or both of them have been selected for individual on-vehicle air conditioners to prepare space G.

Use of motor 18 of the present invention can lower the accuracy of space G to be used for lowering a collision sound, so that it is not needed to measure the dimensions of respective components before they are assembled into the motor. The number of assembling steps of motor 18 can be thus reduced, and the productivity is improved.

Another example in accordance with this embodiment is described hereinafter with reference to FIG. 10. Similar structural elements to those shown in FIG. 6-FIG. 8 have the same reference marks and the descriptions thereof are quoted from them.

Figure 10:
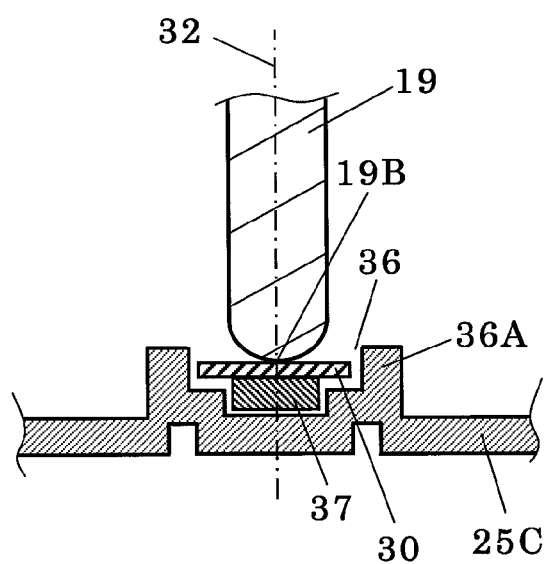
FIG. 10 is an enlarged view of an essential part of another motor in accordance with the embodiment.

FIG. 10 is an enlarged view of an essential part showing a vicinity of bearing section 36 of motor 18. Bearing section 36 is formed of projection 36A. Shaft 19 collides with thrust plate 30 at the center of plate 30 along axial direction 32. Buffering plate 37 supports thrust plate 30 such that restoring force F to be applied to the center of thrust plate 30 can be buffered. As a result, even if a cross sectional area of buffering plate 37 is smaller than that of thrust plate 30 along axial direction 32, an advantage similar to what is produced by the structure shown in FIG. 6 can be obtained.

The thickness of buffering plate 37 along axial direction 32 can be smaller or greater than the thickness of thrust plate 30. The width of buffering plate 37 along a vertical direction relative to axial direction 32 can be smaller or greater than the width of thrust plate 30. Buffering plate 37 has at least one bumpy surface, whereby the effect of lowering the collision sound can be increased.

The previous description refers to a structure for lowering the collision sound produced by the collision between shat 19 and thrust plate 30; however, the embodiment shows the example in which space G is prepared. With this structure, when shaft 19 jumps, rotor yoke 28A collides with bearing 27, thereby producing another collision sound. On the other hand the embodiment shows the other example in which washer 34 is disposed between rotor yoke 28A and bearing 27. With this structure, rotor yoke 28A collides with bearing 27 via washer 34. An appropriate selection of the material for washer 34 allows washer 34 to buffer the shock produced by the collision between rotor yoke 28A and bearing 27. From this point of view, washer is preferably made of resin rather than metal because the resin has more elasticity than the metal. In other words, use of resin, which has a low friction on surface and a certain mechanical strength, as the material for washer 34 allows not only mitigating scars or frictional wear produced when rotor yoke 28A touches bearing 27, but also lowering the collision sound produced by the collision. In view of mechanical strength and lowering the collision sound, washer 34 is preferably made of polyester resin such as polyethylene terephtalate (PET). To increase the buffering effect on the shock, multiple washers 34 can be disposed while space G is prepared.

The foregoing description refers to a brushless motor of inner rotor type; however, the present invention is not limited to this example, for instance, the present invention is applicable to an outer rotor type motor or a motor with brush.

The foregoing description refers to a motor that uses magnetic restoring force; however, the present invention is not limited to the motor using the restoring force, for instance, the present invention is applicable to a motor of which rotor moves along the shaft due to a shock, e.g. a motor using its own weight.

INDUSTRIAL APPLICABILITY

The present invention is suitable for on-vehicle air conditioners, and also applicable to devices, e.g. on-vehicle cooling device, which need saving space and buffering a collision sound caused by a shock.

The invention claimed is:
1. A motor comprising:
a motor housing having an axial end side that closes the motor housing;

a shaft placed axially movable inside the motor housing for rotation and having a thrust end positioned on the axial end side of the motor housing;

a rotor mounted securely to the shaft for rotation with the shaft;

a stator secured radially adjacent to the rotor via a space inside the motor housing, wherein magnetic centers of the rotor and stator are axially offset such that a magnetic restoring force is generated to urge the shaft towards the axial end side of the motor housing;

a thrust plate being disposed in the motor housing between the shaft and the axial end side of the motor housing; and an elastic buffering plate for elastically damping vibrations being held in the motor housing between the thrust plate and the axial end side of the motor housing.

2. The motor of claim 1, wherein the elastic buffering plate is made of one of rubber, foamed material, and adhesive.

3. The motor of claim 1 further comprising a bearing mounted around the shaft, and a washer disposed around the shaft at a position axially between the rotor and the bearing.

4. The motor of claim 3, wherein the washer is made of resin.

5. An on-vehicle air conditioner employing the motor as defined in claim 1.

6. An on-vehicle air conditioner employing the motor as defined in claim 2.

7. An on-vehicle air conditioner employing the motor as defined in claim 3.

8. An on-vehicle air conditioner employing the motor as defined in claim 4.

9. The motor of claim 1, wherein the elastic buffering plate has Young's modulus equal to or greater than 9 MPa.

10. The motor of claim 1, wherein the elastic buffering plate has projections formed on at least one of axially end surfaces of the elastic buffering plate.

11. The motor of claim 2, wherein the rubber is one of silicone rubber, methyl silicone and fluororubber.

12. The motor of claim 2, wherein the foamed material is one of rubber sponge and urethane sponge.

13. The motor of claim 2, wherein the adhesive is silicone intimate mixture.

14. The motor of claim 3, wherein there is a gap present between the washer and the bearing, and the elastic buffering plate has a thickness greater than a sum of the gap and a thickness of the washer.

* * * * *